United States Patent [19]

Hearn et al.

[11] Patent Number: 5,523,062
[45] Date of Patent: Jun. 4, 1996

[54] CATALYTIC DISTILLATION DISTRIBUTION STRUCTURE

[75] Inventors: Dennis Hearn; Gary R. Gildert, both of Houston; Edward M. Jones, Jr., Friendswood, all of Tex.

[73] Assignee: Chemical Research & Licening Company, Pasadena, Tex.

[21] Appl. No.: 333,752

[22] Filed: Nov. 3, 1994

[51] Int. Cl.⁶ .................................................. B01J 8/04
[52] U.S. Cl. ............................ 422/195; 203/DIG. 6; 261/112.2; 261/113; 422/191; 422/220
[58] Field of Search ............................ 422/188, 190, 422/191, 195, 220; 261/112.2, 113, 114.5; 203/DIG. 6

[56] References Cited

U.S. PATENT DOCUMENTS

| | | | |
|---|---|---|---|
| 2,591,343 | 4/1952 | Eld | 261/113 |
| 2,692,128 | 10/1954 | Bowles | 261/114 |
| 2,693,949 | 11/1954 | Huggins | 261/114 |
| 2,767,967 | 10/1956 | Hutchinson | 261/113 |
| 3,599,943 | 8/1971 | Munters | 261/112.2 |
| 4,174,363 | 11/1979 | Bruckert | 261/114 |
| 4,275,021 | 6/1981 | Kirkpatrick et al. | 261/114 |
| 4,278,621 | 7/1981 | Sigmund et al. | 261/114 |
| 4,301,098 | 11/1981 | Mix | 261/114 |
| 4,302,356 | 11/1981 | Smith, Jr. | 203/DIG. 6 |
| 4,708,852 | 11/1987 | Helbling, Jr. et al. | 422/220 |
| 4,710,326 | 12/1987 | Seah | 261/112.2 |
| 4,731,229 | 3/1988 | Sperandio | 422/188 |
| 4,882,130 | 11/1989 | Asai et al. | 261/112.2 |
| 5,073,236 | 12/1991 | Gelbein et al. | 422/191 |
| 5,266,546 | 11/1993 | Hearn | 422/300 |
| 5,413,741 | 5/1995 | Buchholz et al. | 261/112.2 |
| 5,431,890 | 7/1995 | Crossland et al. | 422/211 |

FOREIGN PATENT DOCUMENTS 0129765  7/1919  United Kingdom .

OTHER PUBLICATIONS

Hutchinson & Baddour, RippleTrays–A New Tool for Vapor Liquid Contacting. Chemical Engineering Progress, 52(12) pp. 503–508. Dec. 1956.

Primary Examiner—Robert Warden
Assistant Examiner—Robert Carpenter
Attorney, Agent, or Firm—Kenneth H. Johnson

[57] ABSTRACT

A distribution element is provided which may be used in packed columns to redistribute the gas and liquid flow evenly across the column. Most simply the element comprises a corrugated plate having openings only at the peaks and valleys of the corrugation. There are no openings in the sloped sides of the corrugations. The distribution element is spaced within the packing to most advantageously utilize the redistribution characteristics of the element for a given system.

4 Claims, 2 Drawing Sheets

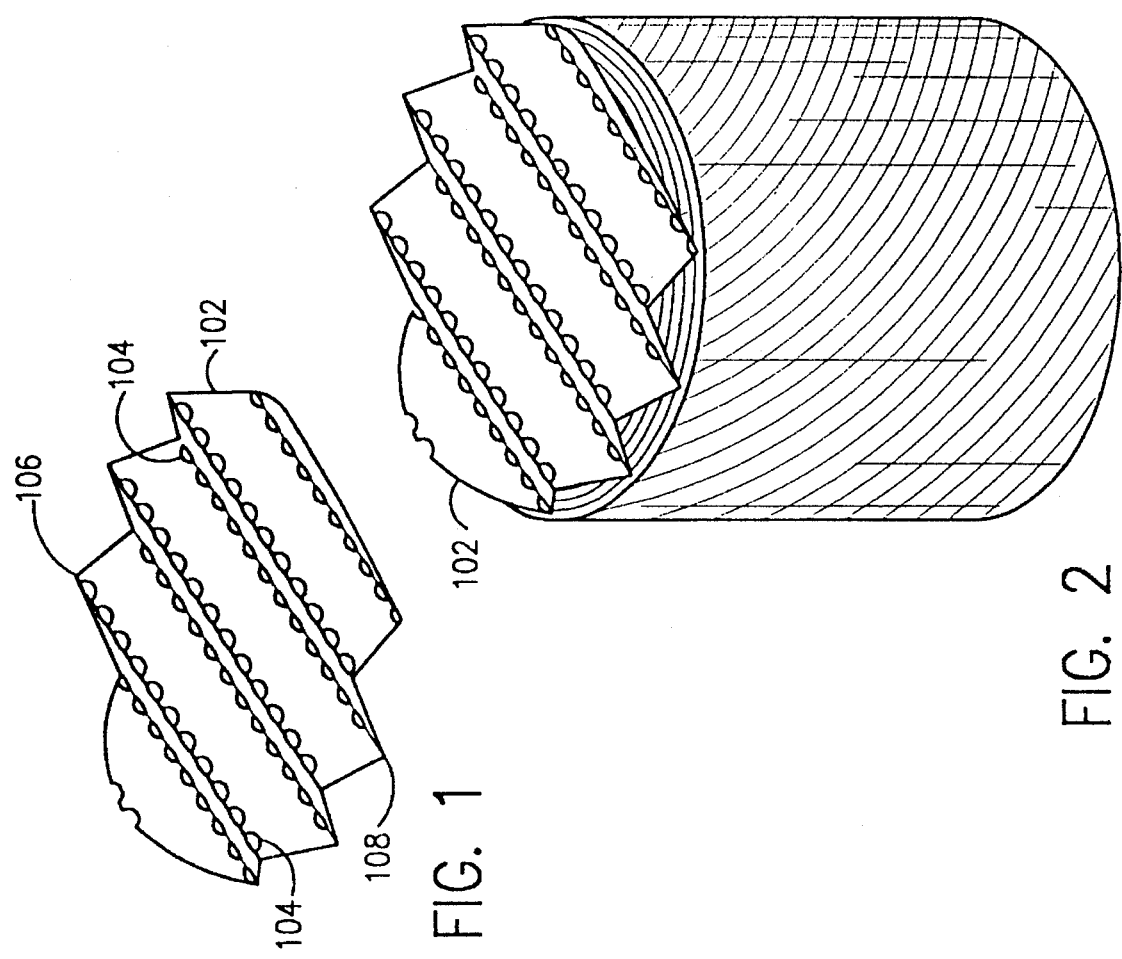
FIG. 2
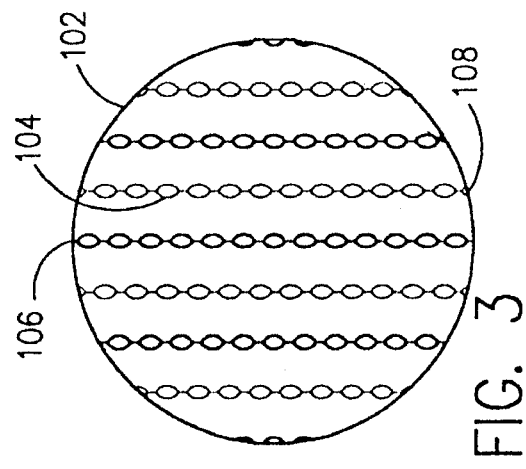
FIG. 1
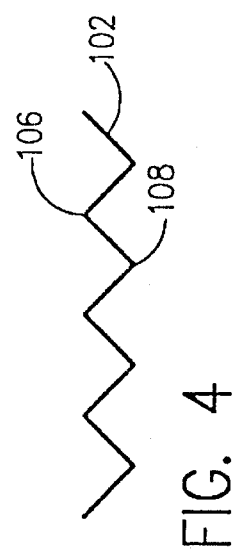
FIG. 3
FIG. 4

CATALYTIC DISTILLATION DISTRIBUTION STRUCTURE

BACKGROUND OF THE INVENTION

1. Field of the Invention

The invention relates generally to a structure which provides mass transfer surface for distillation. More particularly, the invention relates to a redistribution component which can be used with catalytic distillation structure to provide enhanced separation and reaction.

2. Related Art

The concurrent reaction and separation of products from reactants has been practiced for some time, and the advantages have been recognized. Examples of the use of concurrent reaction and distillation are disclosed in U.S. Pat. Nos.:(etherification) 4,232,177; 4,307,254; 4,336,407; 4,504,687; 4,918,243; and 4,978,807; (dimerization) 4,242,530; (hydration) 4,982,022; (dissociation) 4,447,668; and (aromatic alkylation) 4,950,834 and 5,019,669.

Several different catalytic distillation structures have been proposed. See for example U.S. Pat. Nos. 4,302,356 and 4,443,559 in which a particulate catalyst is contained within the pockets on a cloth belt wound with demister wire to form a catalytic distillation structure and U.S. Pat. No. 4,731,229 which discloses a packing with corrugated elements and tape form catalyst member. In U.S. Pat. No. 5,073,236 the structures comprise two parallel gas permeable plates having the catalyst between them, are vertically placed within a column directly adjacent another pair of the plates containing the catalyst. The close packing of plates containing the catalyst when placed into the column may present too dense a catalyst bed in some instances and thus increase the residence time beyond that necessary for a given reaction.

Structures made from cloth such as fiber glass belts with pockets are wound into helix with a layer of demister wire to provide structural integrity to the resultant bale and to provide the necessary open space for a distillation. See for example U.S. Pat. No. 4,302,356. Other structures have used a plurality of layered sheets of wire with catalyst pockets bundled together. See U.S. Pat. No. 5,073,236. A final structure includes a series of mesh tubular containers for the catalyst placed horizontally across a rectangle of demister wire and then rolled into a bale as described in U.S. Pat. No. 5,431,820.

All of the present catalytic distillation structures are multicomponent. A multicomponent catalytic distillation structure may be subject to channeling of liquid and vapors and in any packed bed. The catalyst particles, even when contained within structures to provide vapor flow, tend to cause more pressure drop than the structures and thus channeling of the liquid and vapors can occur. This channeling may especially affect the reaction between two reactants one of which is a gas and the other a liquid because the channeling prevents optimum contact with the catalyst component.

Corrugated type distillation trays are known in the art. See for example U.S. Pat. Nos. 2,591,343 and 2,767,967. Both references disclose corrugated trays that have openings disposed over the entire surface of the trays, including the angled flat sides. The feature of the corrugation being covered with openings is to provide more surface area for the opening and thus better vapor-liquid contact. The trays of U.S. Pat. No. 2,767,967 were tried as replacement trays in columns for trays with downcomers.

It is a feature of the present invention that the reaction and separation characteristics of columns containing the catalytic distillation structures can be improved. The separation characteristics of a plain packed distillation column may also be improved.

SUMMARY OF THE INVENTION

The present invention comprises a distribution element which may be used in packed columns to redistribute the gas and liquid flow evenly across the column. Most simply the element comprises a corrugated plate having openings only at the peaks and valleys of the corrugation. There are no openings in the sloped sides of the corrugations. The distribution element is spaced within the packing to most advantageously utilize the redistribution characteristics of the element for a given system.

BRIEF DESCRIPTION OF THE DRAWINGS

FIG. 1 is a perspective view of a distribution element according to the present invention.

FIG. 2 is a perspective view of a distribution element according to the present invention supported on a catalyst bale.

FIG. 3 is a top plan view of a distribution element according to the present invention.

FIG. 4 is a side elevational view of a distribution element according to the present invention.

DESCRIPTION OF THE PREFERRED EMBODIMENTS

Figure 7:
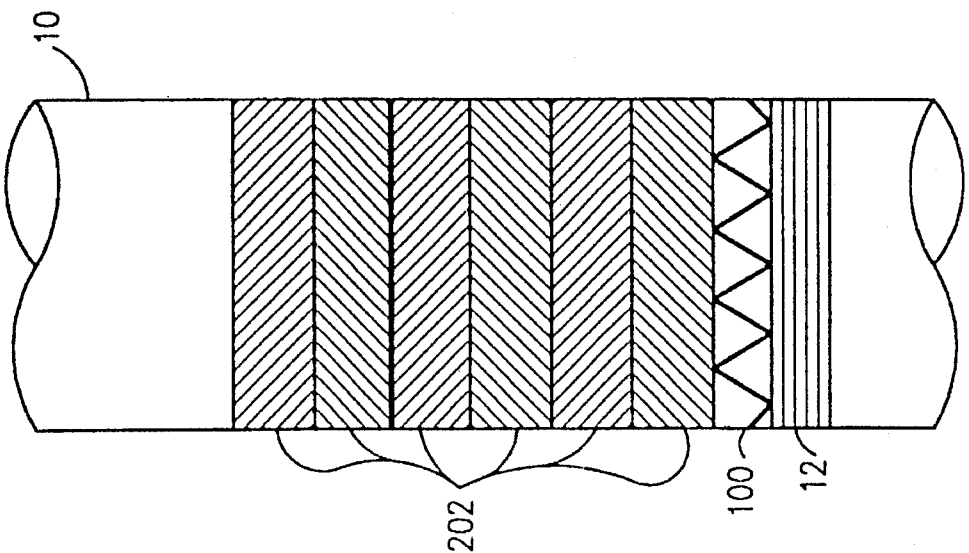
FIG. 7 is a side elevational view in schematic of a reaction distillation column utilizing the distribution element in a final embodiment.

The present invention is designed to be used in distillation column reactors having catalytic distillation structures stacked within the column.

A first type of catalytic distillation structure is a "bale" comprises placing a mole sieve or cation exchange resin particles into a plurality of pockets in a cloth belt, which is supported in the distillation column reactor by open mesh knitted stainless steel wire by twisting the two together in a helical form. This allows the requisite flows and prevents loss of catalyst. The cloth may be any material which is inert in the reaction. Cotton or linen are useful, but fiber glass cloth or "Teflon" cloth are preferred. The mole sieve catalyst is preferred for the alkylation of benzene, especially with ethylene or propylene to produce ethyl benzene or cumene. The cation exchange resins are preferred for the production of methyl tertiary butyl ether (MTBE) or tertiary amyl methyl ether (TAME). The cloth belt/demister wire arrangement is more completely described in U.S. Pat. No. 4,302,356 which is herein incorporated by reference.

A second type of catalytic distillation structure comprises at least one plurality of flexible, semi-rigid open mesh tubular elements filed with a particulate catalytic material (catalyst component) and sealed at both ends, intimately associated with and supported by a wire mesh screen coiled into a spiral having a longitudinal axis, said tubular element being arrayed at an angle to the longitudinal axis thereby forming a bale.

The flexible, semi-rigid open mesh tubular element filed with a particulate catalytic material preferably has a fastener every 1–12 inches along the length of the tube to form a multiple link shaped catalytic distillation structure. The links formed by the fasteners may be evenly or irregularly spaced.

The bale shaped catalytic distillation structures are formed by placing at least one tubular element on top of the wire mesh screen, such as demister wire, in a diagonal array, such that when the wire mesh screen is rolled up, the rolled structure provides a new and improved catalytic distillation structure. Further embodiments include multiple stack arrangements of alternating wire screen mesh and tubular elements that are rolled into a new bale shaped catalytic distillation structure. The tubular elements on alternating layers are preferably arrayed on the wire mesh screen in opposite directions such that their paths cross. Each tubular element will define a spiral within the bale.

The catalyst component may take several forms. In the case of particulate catalytic material, generally from 60 mm to about 1 mm down through powders, is enclosed in a porous container such as screen wire, or polymeric mesh. The material used to make the container must be inert to the reactants and conditions in the reaction system. The screen wire may be aluminum, steel, stainless steel, and the like. The polymer mesh may be nylon, teflon, or the like. The mesh or threads per inch of the material used to make the container is such that the catalyst is retained therein and will not pass through the openings in the material. Although the catalyst particles of about 0.15 mm size or powders may be used and particles up to about ¼ inch diameter may be employed in the containers.

The wire mesh type containers and belts have been found to be more useful for hydrogenation type reactions which utilize larger gas flow than other reactions.

In addition to the bale type structures there are other structures which may utilize the distribution element. These are variously described in U.S. Pat. Nos. 5,057,468; 5,189,001; 5,262,012 and 5,266,546 all of which are herein incorporated by reference. These latter structures are all loosely loaded into a column and thus are not bales. The distribution element is placed in columns utilizing these structures in strategic places to enhance reaction and separation.

Referring now to FIGS. 1–4 a specific embodiment of a distribution element 100 according to the present invention is shown. The element on the whole is shown to be circular in surface area to fit inside a distillation column or reactor. The whole element may be made of several pieces for easier insertion into a distillation column or reactor. The diameter of the entire element is slightly less than the diameter of the column into which they are to be inserted but will substantially cover the entire inner diameter. The elements are simply placed on top of the bales or packing which is in the column as shown in FIG. 2.

For ease of construction the openings 104 are made in the plate 102 prior to corrugation. In other words the openings 104 are stamped or otherwise drilled into the flat plate 102 in rows. The plate is then bent at each of the rows at an angle of about 45° from the horizontal. The distance between the center line of the rows is adjusted to give about two inches between each peak 106 and valley 108 or a peak to peak distance of about four inches. The distance between rows for the 45° slope would therefore be about 2.848 inches. Each adjacent slope of the corrugations would thus be at 90° from its neighbor. The angle from the horizontal may be adjusted anywhere from 15° to 75° as desired to give the desired depth for a given center to center spacing. The openings should cover between 5 to 25 per cent of the total column area, preferably 10 to 20 per cent. The openings are preferably ½ to 1 inches in diameter. Constructed thus the openings are only located at the peaks and valleys of the corrugations. The openings at the peaks and valleys do not necessarily have to be the same size. The element is continuous on the slopes or walls of the corrugations.

Figure 5:
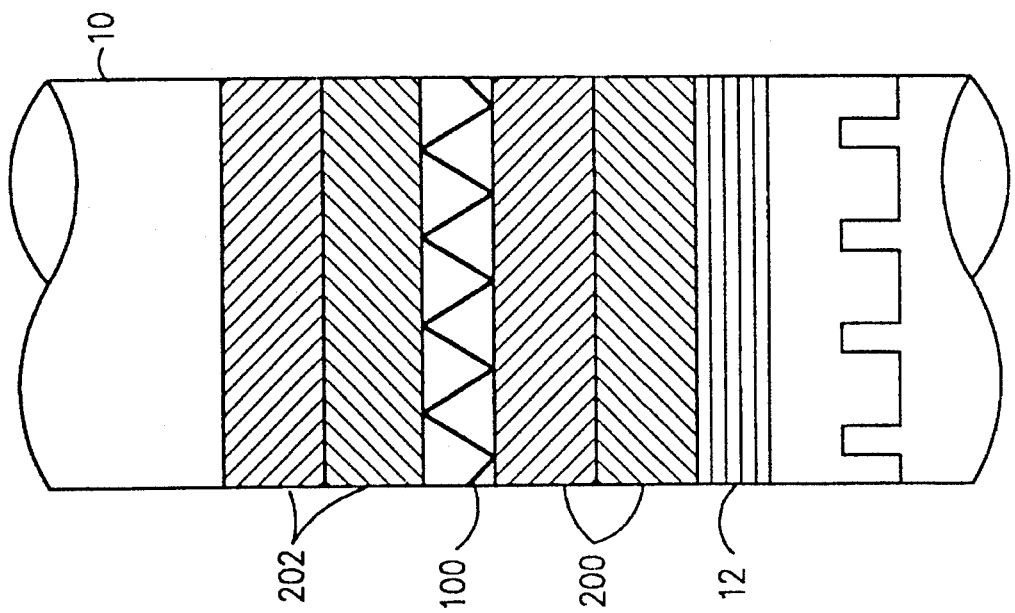
FIG. 5 is a side elevational view in schematic form of a reaction distillation column utilizing the distribution element in the production of methyl tertiary butyl ether or tertiary amyl methyl ether.

The arrangement of the distribution elements and bales within the column depends upon the particular process. In FIG. 5 there is shown an arrangement of catalyst bales 202 and distribution elements 100 inside a distillation column reactor 10 used for the production of either MTBE or TAME. As may be seen the bales 202 are supported in the column by a support grating 12. Two layers of bales 202 are separated by one distribution element 100. Each layer 202 comprises one height of a multitude of the bales as previously describe catalyst in cloth pockets wound into a spiral with demister wire. The height of each bale is typically 6–30 inches and the height of the distribution element 100 is about 2 inches. In a unit utilizing this arrangement for the production of TAME the conversion of isoamylene (methanol being in excess) was noted to be about 96% as opposed to TAME units utilizing the bales only which give about 92% conversion.

Figure 6:
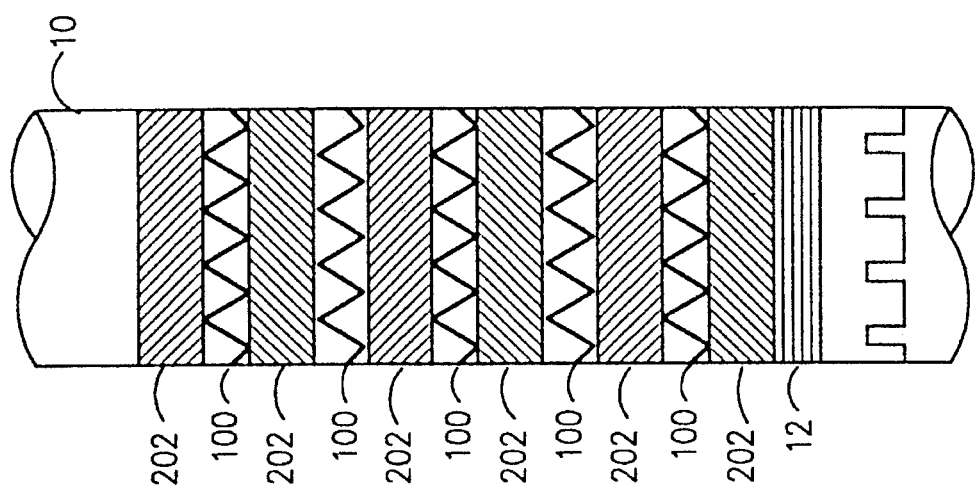
FIG. 6 is a side elevational view in schematic form of a reaction distillation column utilizing the distribution element in a process for the hydrogenation of $C_4$'s.

Referring now to FIG. 6 there is shown an arrangement of catalyst bales 202 and distribution elements 100 inside a distillation column reactor 10 used for the hydrogenation of $C_4$'s using bales of catalyst structure of the second type. Because of the high relative vapor flow and the separation desired each layer 202 is separated by a distribution element 100. As in the MTBE/TAME arrangement the catalyst bales are supported in the column 10 by a catalyst support grating 12.

A final arrangement is shown in FIG. 7 and is generic for redistribution of the liquid after leaving a bed containing bales 202. The distribution tray 100 is placed below the bed of bales 100 to redistribute the liquid prior to the liquid flowing down the column for further distillation.

While the two specific arrangements are shown it is contemplated that the distribution element may be used with loosely packed catalytic distillation structures or simply with columns packed with inert distillation structure.

The invention claimed is:

1. A distillation system comprising:

a distillation column;

a plurality of catalytic distillation structures disposed within said column in a plurality of layers and a distribution element placed between at least two of said layers, said distribution element comprising a corrugated disk having openings located only along the peaks and valleys and a continuous surface between said peaks and valleys wherein the angle of the slope of said corrugations is between 15 and 75 degrees from the horizontal.

2. The distillation system according to claim 1 wherein said openings are form ½ inch to 1 inch in diameter and said openings comprise about 5–25 per cent of the area of said distribution element.

3. The distribution system according to claim 1 wherein the diameter of said disk is slightly less than inner diameter of said packed column.

4. The distribution system according to claim 1 wherein said openings comprise 5–25 per cent of the area of said element.

\* \* \* \* \*